(12) United States Patent
Shigekusa

(10) Patent No.: US 7,669,143 B2
(45) Date of Patent: Feb. 23, 2010

(54) INFORMATION READING APPARATUS WITH A SCREEN FOR DISPLAYING STORED SYMBOL IMAGES

(75) Inventor: Hisashi Shigekusa, Okazaki (JP)

(73) Assignee: Denso Wave Incorporated, Tokyo (JP)

( * ) Notice: Subject to any disclaimer, the term of this patent is extended or adjusted under 35 U.S.C. 154(b) by 747 days.

(21) Appl. No.: 11/311,541

(22) Filed: Dec. 20, 2005

(65) Prior Publication Data

US 2006/0163356 A1    Jul. 27, 2006

(30) Foreign Application Priority Data

Jan. 26, 2005  (JP) .............................. 2005-018314

(51) Int. Cl.
*G06F 3/048* (2006.01)

(52) U.S. Cl. .................. 715/830; 715/828; 715/829

(58) Field of Classification Search ................ 345/156, 345/168, 169; 235/462.01; 382/313, 314; 341/20, 22, 23, 26; 715/828, 829, 830
See application file for complete search history.

(56) References Cited

U.S. PATENT DOCUMENTS

| | | | |
|---|---|---|---|
| 5,805,167 A | | 9/1998 | Van Cruyningen |
| 6,360,948 B1 * | | 3/2002 | Yang et al. .............. 235/462.1 |
| 6,466,231 B1 | | 10/2002 | Dow et al. |
| 6,612,497 B1 * | | 9/2003 | Iida et al. .............. 235/462.25 |
| 6,690,391 B1 * | | 2/2004 | Proehl et al. ................ 715/720 |
| 6,910,191 B2 * | | 6/2005 | Segerberg et al. ............ 715/830 |
| 6,966,037 B2 * | | 11/2005 | Fredriksson et al. ........ 715/830 |
| 6,976,228 B2 * | | 12/2005 | Bernhardson ............... 715/830 |
| 7,080,394 B2 * | | 7/2006 | Istvan et al. .................... 725/43 |
| 7,454,713 B2 * | | 11/2008 | Spalink et al. .............. 715/828 |

FOREIGN PATENT DOCUMENTS

| | | |
|---|---|---|
| CN | 1244689 A | 2/2000 |
| JP | A-2004-032548 | 1/2004 |
| WO | WO 03/079177 | 9/2003 |
| WO | WO 2004/107753 | 12/2004 |

OTHER PUBLICATIONS

Office Action dated May 16, 2008 in corresponding Chinese patent application No. 2006100069375 (and English translation).

* cited by examiner

*Primary Examiner*—My-Chau T Tran
(74) *Attorney, Agent, or Firm*—Posz Law Group, PLC

(57) ABSTRACT

An information reading apparatus such as a handheld personal device comprises a memory having a plurality of cells arranged in a two-dimensional array of rows and columns. Each cell stores a symbol image to be displayed on a screen. When a matrix array of cells is displayed, a cursor key is used to select one of the displayed cells as a candidate by moving a selection point by one cell at a time in response to a user's operation and is used to enter a user's decision command when a desired candidate is displayed at the center of the screen. A matrix array of cells including the selected cell and its neighbor cells are read from the memory and displayed so that the selected cell is positioned at the center of the screen. The processes of reading and displaying are repeated in response to a user's operation until the user's decision command is entered.

31 Claims, 13 Drawing Sheets

000# INFORMATION READING APPARATUS WITH A SCREEN FOR DISPLAYING STORED SYMBOL IMAGES

CROSS-REFERENCE TO RELATED APPLICATION

This application is based on Japanese Patent Applications No. 2005-018314, filed Jan. 26, 2005, which is incorporated herein by reference.

BACKGROUND OF THE INVENTION

1. Field of the Invention

The present invention relates to an information reading apparatus such as a handheld personal device with a screen for displaying stored images and more specifically to an information reading apparatus capable of wirelessly reading a printed code such as one-dimensional bar codes, two-dimensional codes, printed characters, or stored data from RFID tags and IC cards.

2. Description of the Related Art

Handheld personal devices such as mobile telephones and personal digital assistant (PDA) are provided with an LCD screen and a key arrangement for allowing the user to enter data, switch screens, point a menu item on the screen and select a desired operating function and mode of the device. To make the device easy to use, a pointing device is provided on the rear surface of the device as disclosed in Japanese Patent Publication 2004-32548.

In prior art display systems, it is the usual practice to group and organize items to be displayed into a tree structure as shown in FIG. 14. If the user wants to select one of items B221 and B222, he has to select the item A2 on the root screen A0, which is initially displayed, to open the selected screen image and proceeds to select the item A22 on the screen of item A2 to open the image of the selected item A22, which shows symbols urging the user to choose one of the items B221 and B222. While this tree-structured approach allows the user to access a desired item with no knowledge of the whole structure, the number of successively key operations would become substantial and take a long time to reach the intended item. If the user desires to change screens from the item B222 to the adjacent item B311, for example, he must first return to the root image A0 and then proceed to successively select screen images of items A3, A31 and B311, with a total of six key operations. This problem can be solved only if a large screen is used. This solution is impractical for handheld personal devices.

SUMMARY OF THE INVENTION

It is therefore an object of the present invention is to achieve quick search for an intended item to be displayed on an information reading apparatus such as a handheld personal device.

According to a first aspect of the present invention, there is provided an information reading apparatus such as a handheld personal device comprising a display unit having a screen, a memory having a plurality of cells arranged in a two-dimensional array of rows and columns, each cell storing at least one symbol image to be displayed on the screen, a key arrangement that selects one of the cells displayed on the screen as a candidate image by moving a point of selection by a distance corresponding to one cell of the memory in response to a user's operation and enters a user's decision command when a desired candidate image is displayed at the center of the screen, and a control unit that performs the functions of reading a matrix array of cells from the memory including the selected cell and adjacent cells surrounding the selected cell and displaying the matrix array on the screen so that the selected cell is positioned at the center of the screen and replaces an adjacent cell which was previously displayed at the center, and repeatedly performs the functions of reading and displaying in response to each of the cells being subsequently selected by a user's operation until the user's decision command is entered.

Since the selected icon image is positioned at the center of a displayed matrix array, the user can easily identify its contents and its position in the two-dimensional array from its neighbor icon images. By repeatedly displaying different matrix arrays of icon images, the user may eventually acquire a whole picture of available icons. This visual impression will assist the user in making a quick search for a desired symbol with a significantly smaller number of key operations than is necessary with the prior art approach in which a search is made through screen images organized in a tree structure.

Preferably, the information reading apparatus is provided with a mode selection key that selects a single-cell display mode or a multi-cell display mode, and wherein the control unit controls the display unit according to mode selected by the mode selection key. During the single-cell display mode, the control unit preferably displays the selected cell on the screen so that it fits in full size of the screen. During the multi-cell display mode, the control unit preferably displays a matrix array of cells including a selected cell and its neighbor cells on the screen so that the matrix array fits in full size of the screen and the selected cell is positioned at the center of the screen. The preferred size of the matrix array is a 3×3 array. The user can change screens from a single-cell full-screen mode to a multi-cell screen mode to make a search for another cell in the 3×3 matrix array. For quick, error-free visual recognition, the symbol image is preferably an icon.

When a user's decision command is entered during the multi-cell display mode, the control unit preferably displays the selected symbol image on the screen so that it fits in full size of the screen. This gives a clear visual impression to the user that his decision command is entered.

The key arrangement includes a cursor key that can be manually tilted in one of four radial directions equally spaced apart at intervals of 90-degree angle to move the selected cell in one of the four radial directions. A simple yet robust pointing mechanism can be implemented. Preferably, the cursor key is manually tilted in one of eight radial directions equally spaced apart at intervals of 45-degree angle to move the selected cell in one of the eight radial directions, providing an easy-to-operate pointing mechanism.

In addition to the tilting mechanism, the cursor key is configured to enter a user's decision command when the cursor key is depressed. With the depression mechanism, the cursor key provides dual functions of pointing and entering decision command.

The control unit is configured to display a root cell when the power switch of the information reading apparatus is turned on. The root cell contains symbol images of the primary functions of the device. The initial display of primary functions of the device enables the user to make a quick selection of a desired function of the device.

At least one of the cells of the two-dimensional (root) array is a multi-function cell which contains a list of symbol images indicating user-selectable functions. The memory further includes a plurality of cells arranged in a matrix (leaf) array of rows and columns and respectively contain the symbol images of the list. One of the cells in the leaf array is a linking cell which is coupled through a link to the multi-function cell of the root array. In response to a user's key operation, the control unit performs switching between the multi-function cell and the leaf array through the link. As a result, the screen can be quickly switched between the symbol image of a multi-function cell and the image of its linked leaf array. This arrangement efficiently increases the amount of cells in terms of the required memory space.

Further, the control unit is configured to display the leaf array so that its linking cell is positioned at the center of the screen when the linked multi-function cell of the root array is selected during a multi-cell display mode. This gives a clear visual indication to the user when the user selects a cell from the leaf array. As an additional preferred feature for using the device, the control unit displays the multi-function cell full screen for a predetermined interval of time before the matrix array of cells is displayed.

Further, as an additional preferred feature for returning the screen image from the leaf array to the root array, the control unit is configured to display the matrix (leaf) array on the screen so that the multi-function cell is positioned at the center of the screen when the linking cell is selected during the multi-cell display mode. Further, the control unit may be configured so that it displays the matrix array of cells, the control unit displays the linking cell full screen for a predetermined interval of time.

When one of the cells of the leaf array is displayed on the screen, the control unit displays the multi-function cell of the root array in full size of the screen, instead of the currently displayed matrix array, in response to a predetermined user's key operation. This allows the user to instantly return the screen image from a single-function cell on a leaf array to its linked multi-function cell, which may be on the root array or on a leaf array that is the parent of the leaf array of the single-function cell.

The two-dimensional array of cells in the memory include at least one cell which is reserved for future use. The reserved cell contains a symbol image represented by a rectangular image of the two-dimensional array with a mark identifying the location of the reserved cell in said rectangular image. This gives a glimpse of the whole structure of the memory to the user, thus serving as an assistance for the user when he makes a decision in which direction to operate the cursor key to reach the desired cell from the location of the reserved cell.

The top and bottom rows of the two-dimensional array of cells are directly connected together and the leftmost and rightmost columns of the two-dimensional array of cells are directly connected together so that the control unit is able to endlessly read the memory in vertical directions and horizontal directions. This eliminates the trouble of having to scroll back from one edge of the two-dimensional array all the-way to the opposite edge of the array.

Preferably, the two-dimensional array of cells include a center column of cells each of which stores one of a plurality of functions of primary importance and a plurality of rows each of which is positioned on each side of the center column and corresponds to one of the cells of the center column, each of the plurality of rows on each side of the center column storing a list of functions of secondary importance associated with the function of the corresponding cell of the center column. Alternatively, the two-dimensional array of cells include a center row of cells each of which stores one of a plurality of functions of primary importance, and a plurality of columns each of which is positioned on each side of the center row and corresponds to one of the cells of the center row, each of the plurality of columns on each side of the center row storing a list of functions of secondary importance associated with the function of the corresponding cell of the center row. With this arrangement, the user can easily recognize the locations of the primary functions and the secondary functions associated with each of the primary functions.

According to a second aspect of the present invention, there is provided a method of displaying stored symbol images on a screen of an information reading apparatus such as a handheld personal device, comprising the steps of (a) storing a plurality of cells in a two-dimensional array of rows and columns of a memory, each of the cells containing a symbol image, (b) selecting one of the cells displayed on the screen as a candidate image by moving a point of selection by a distance corresponding to one cell of the array in response to a user's operation, (c) reading a matrix array of cells from the memory including the selected cell and neighboring cells surrounding the selected cell, (d) displaying the matrix array on the screen so that the selected cell is positioned at the center of the screen, and (e) entering a user's decision command when a desired candidate image is displayed at the center of the screen.

BRIEF DESCRIPTION OF THE DRAWINGS

The present invention will be described in detail with reference to the following drawings, in which:

FIGS. 6A and 6B are illustrations of a root cell displayed successively in full size of the screen when the power of the device is initially turned on;

DETAILED DESCRIPTION

Figure 1:
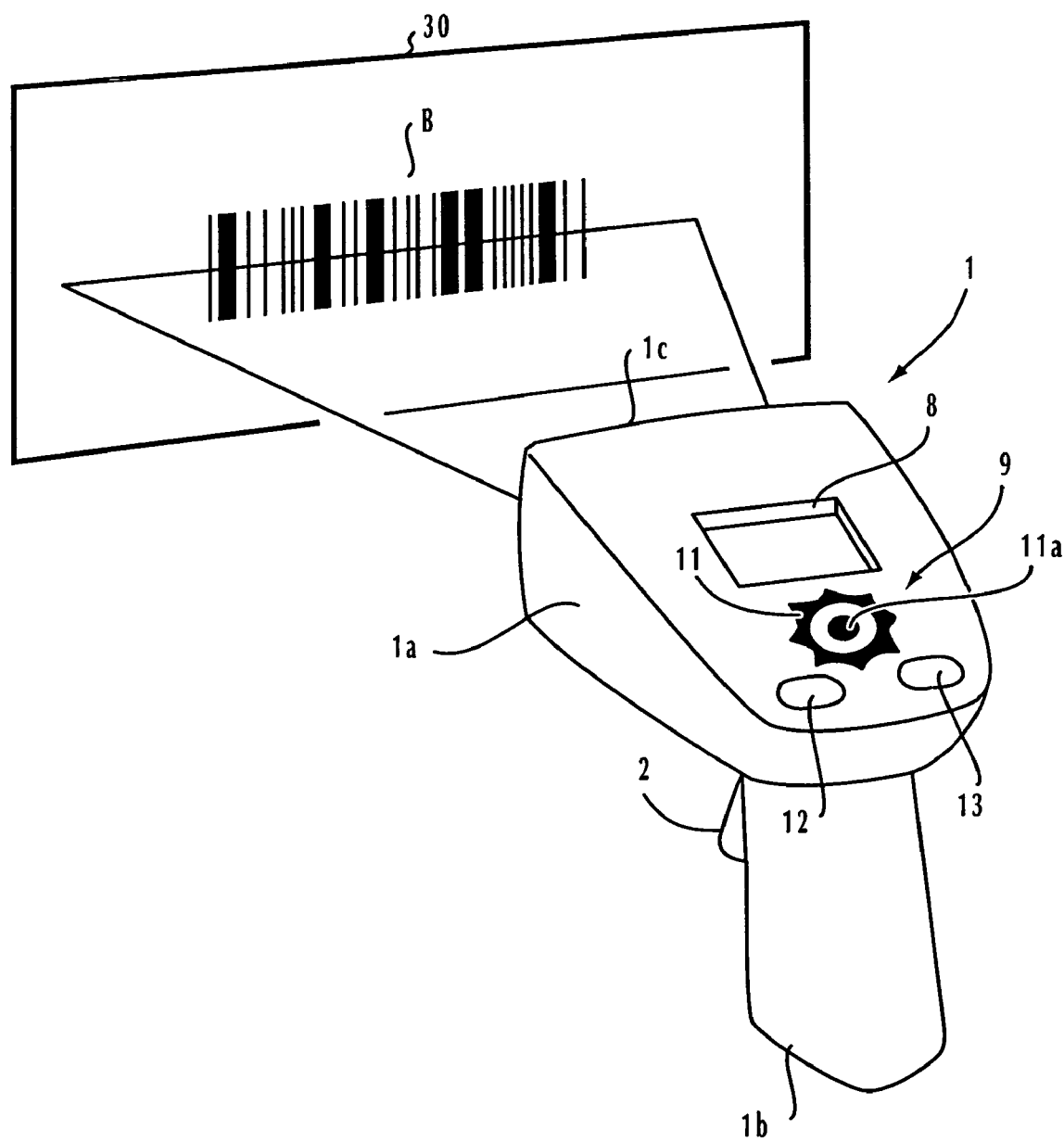
FIG. 1 is a perspective view of a handheld personal device in which the present invention is embodied.
Figure 2:
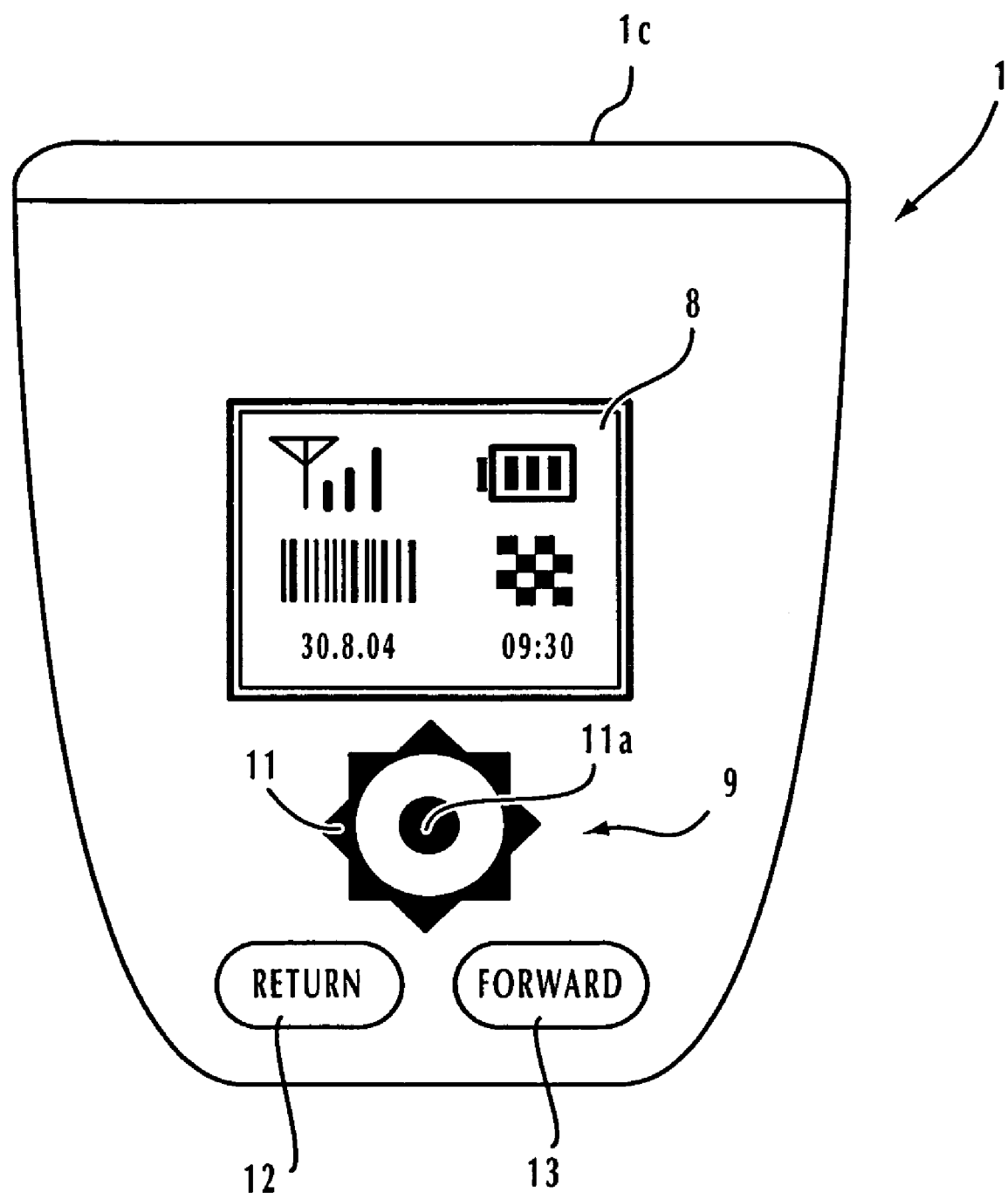
FIG. 2 is a top plan view of the device of FIG. 1.

Referring now to FIGS. 1 and 2, a handheld personal data device (gun-type) having a built-in display screen is shown as one example of the present invention. The personal data device of FIGS. 1 and 2 is illustrated as a means for wirelessly (using laser beams, infra-red light or radio-frequency signals) for reading pictorial and textual coded information such as bar codes of either one-dimensional or two-dimensional type, OCR characters, and digital information transmitted from RFID (radio frequency identification) tags or non-contact IC cards.

The personal data device is encased in a housing 1 having an upper portion 1a with rounded corners, and a lower grip portion 1b, with the upper portion 1a being formed into a shape having a front end 1c that tapers toward a rear end. Grip portion 1b is provided on its upper end with a trigger switch 2 that is manually operated by a user to send a read command signal. On the front side 1c is a horizontally elongate transparent window, not shown, through which a sensing light beam is emanated toward a target object 30 and through which reflections from the target object are detected.

On the surface of the upper portion 1a is a 1.5-inch or less color LCD (liquid crystal display) panel 8 and a key arrangement 9. Key arrangement 9 is constructed of a cursor key 11 and a set of eight angularly spaced hidden switches and a center hidden switch (not shown). Cursor key 11 is configured in such a manner that it tilts in response to the user depressing one of its eight angularly spaced positions. When the cursor key 11 is tilted in one of the eight directions, it closes a corresponding one of the hidden switches and moves the position of a symbol image displayed on the screen 8 in one of two horizontal and two vertical directions and one of four oblique directions which are 45 degrees skewed with respect to the horizontal and vertical directions. When the center point 11a of the cursor key 11 is depressed by the user, it closes the center hidden switch and enters a user' decision command. In the following description, the center point 11a of the cursor key 11 is called "enter key" for convenience.

As described below, the cursor key 11 is used to select a symbol image contained in a memory cell displayed on the screen as a candidate image and the enter key 11a is depressed when a desired candidate image is positioned at the center of the screen 8. Additionally provided are a return key 12 and a forward key 13. These keys are also used to indicate the display mode in which the device is operated. Specifically, when the return key 12 is operated, the device is operated in a single-cell display mode and when the forward key 13 is operated the device is operated in a multi-cell display mode.

Figure 3:
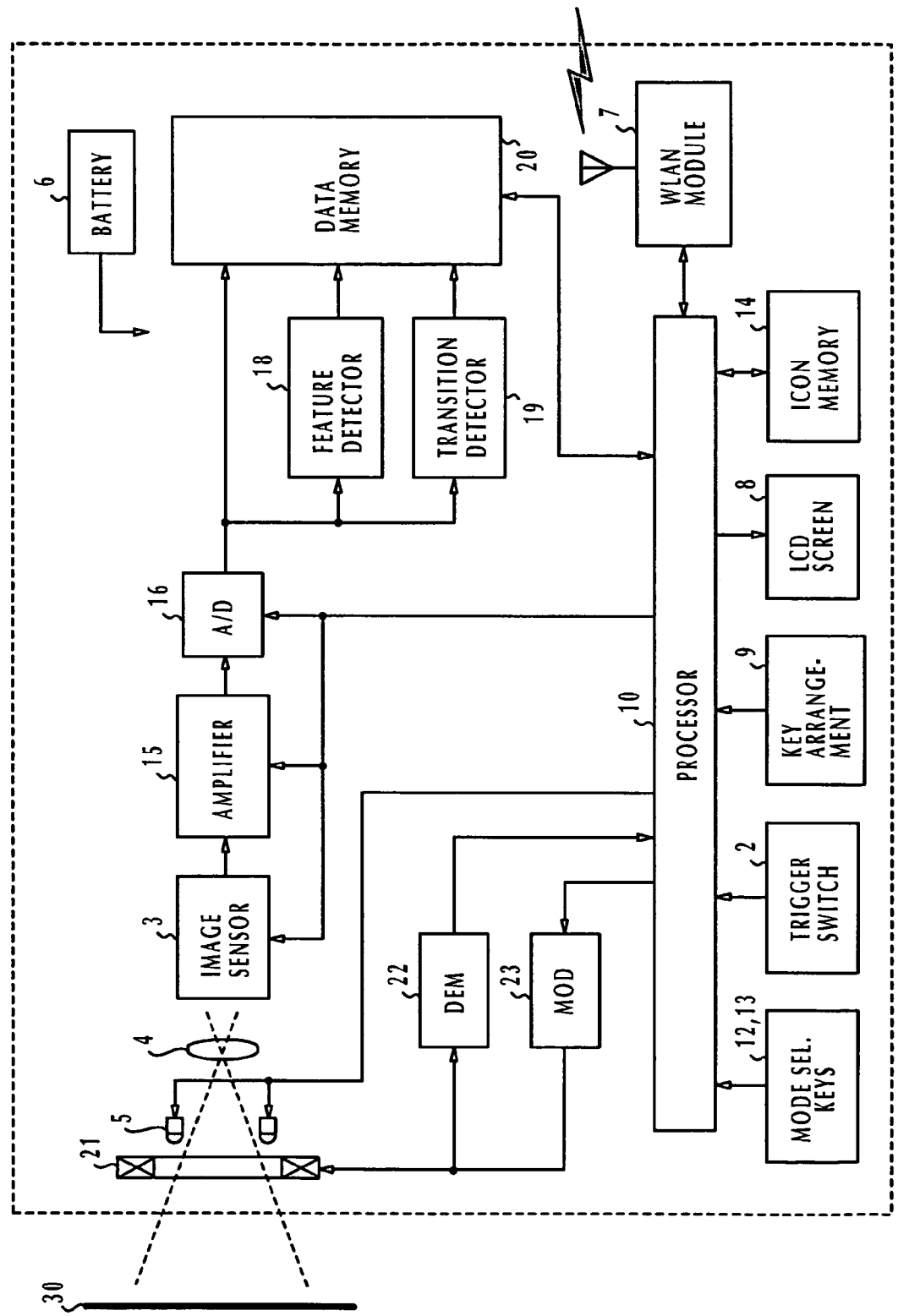
FIG. 3 is a block diagram of the control circuitry of the device.

As shown in FIG. 3, the handheld personal device 1 is provided with an optical sensing and reading mechanism comprising a CCD area image sensor 3, a lens system 4 for focusing incident light onto the image sensor 3, and a light illuminator 5 formed with multiple LEDs and small lenses to illuminate a bar code B (or characters) on the target object 30 with a sensing light beam. Light rays reflected off the target object 30 are focused by the lens system 4 onto the image sensor 3 to produce visual information. Further provided is an antenna coil 21 located near the front end 1c that wirelessly interact with an RFID tag and a non-contact IC card. A demodulator 22 and a modulator 23 are connected to the antenna coil 21 to exchange signals between the antenna coil 21 and a processor 10.

Processor 10 receives signals from the mode selecting keys 12, 13, trigger switch 2, and key arrangement 9 and provides an overall control of the device including the LCD panel 8 and a wireless LAN module 7 that performs wireless data communication with an external system.

As described in detail later, the device 1 is provided with an icon memory 14 in which data representing symbol (icon) images are stored in a matrix array of cells. The stored data are read out of the icon memory 14 by the processor 10 and displayed on the LCD screen 8. In response to a command signal supplied from the trigger switch 2, the processor 10 controls the image sensor 3 and the light illuminator 5 to read optical information from the target object 30. The image detected by the image sensor 3 is amplified in an amplifier 15 and converted to a digital signal by an A/D converter 16, all of which are activated when the processor 10 receives a command signal from the trigger switch 2. The digital image signal is supplied to a feature detector 18 and a transition detector 19 and a data memory 20. Feature detector 18 and transition detector 19 are known in the art to analyze the pictorial information obtained from the target object 30. All circuit elements of the personal device 1 receive power from a battery 6.

Figure 4:
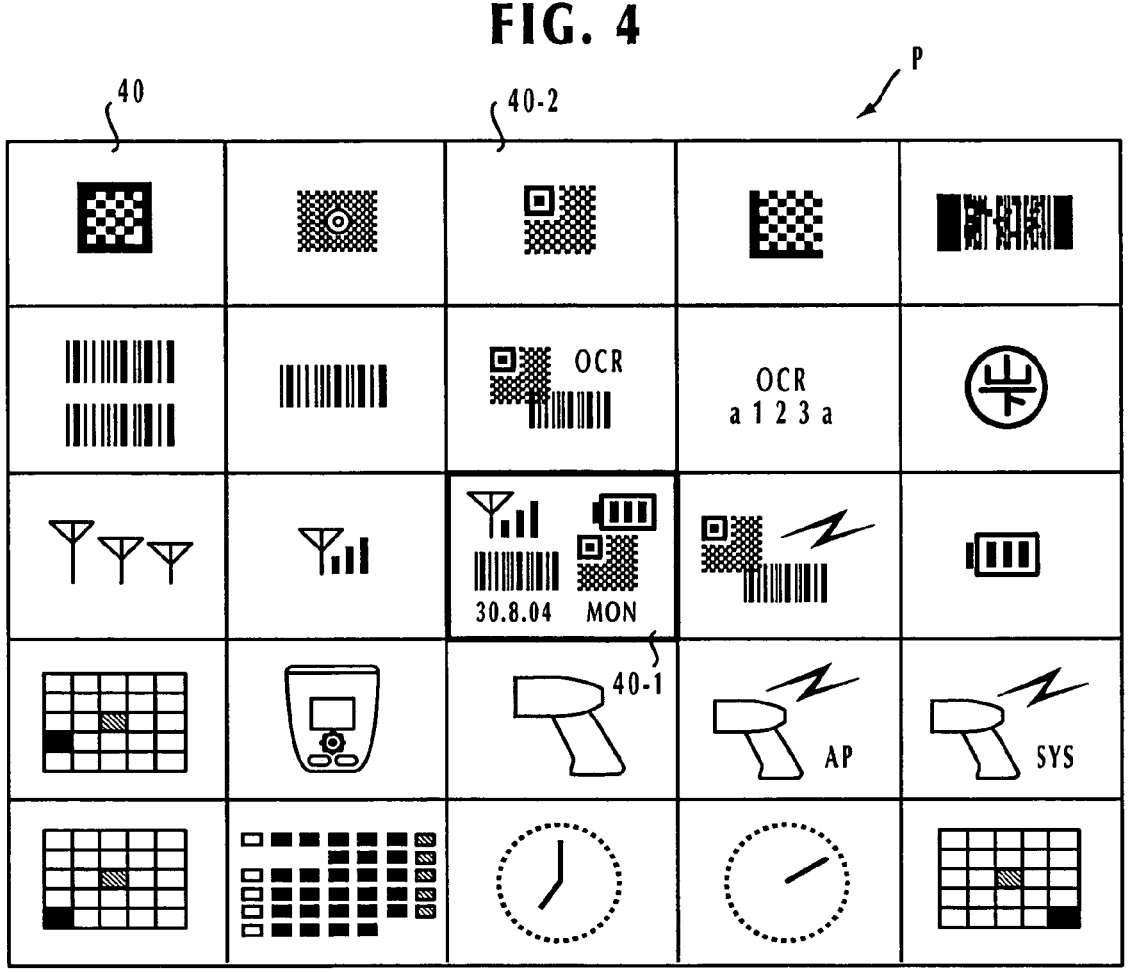
FIG. 4 is a diagrammatic view of a matrix array of cells stored in the icon memory of FIG. 3.

FIG. 4 shows details of the data stored in the icon memory 14. Icon memory 14 is partitioned into a two-dimensional array of memory locations or cells 40. Each cell 40 stores a unique symbol image or icon. Specifically, the memory is partitioned into a matrix array of five rows of five columns. Each icon image represents the availability to recognize the input information symbolized by the icon mage. The recognition capability, or function that can be performed by the processor 10 can be set in the personal device 1 as desired to read and interpret intended pictorial and textual information.

Figure 5:
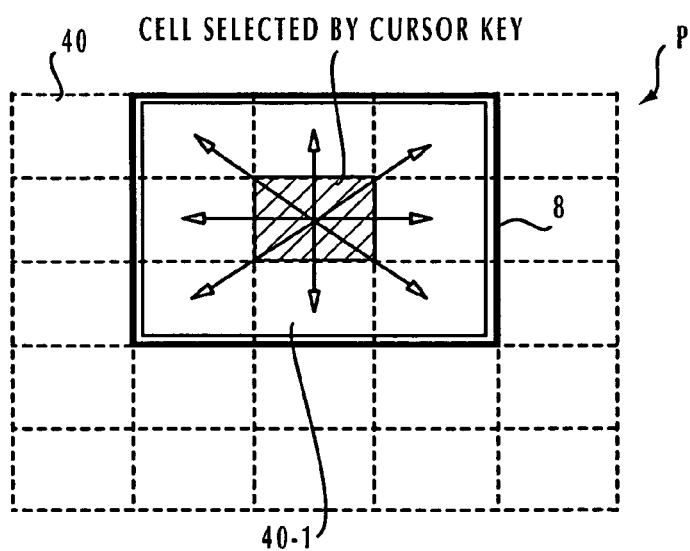
FIG. 5 is an illustration useful for describing the operation of a cursor key when selecting a cell in a matrix array of cells and the operation of the processor when displaying the matrix array so that the selected cell is positioned at the center of the screen.

As shown in FIG. 5, in response to a user's key operation, the cursor key 11 selects one of the cells displayed on the screen 8 as a candidate image by moving the point of selection (by lighting cell in reverse) in one of eight directions (vertical, horizontal and oblique directions) by a distance corresponding to one cell of the 5×5 array P. As a result, each time the cursor key 11 is operated, the point of selection is moved one cell at a time. Enter key 11a is operated to enter a user's decision command when a desired candidate image is displayed at the center of the screen 8.

In the cells of two upper rows of the 5×5 matrix array, icon images of different types of optical information are stored. In the top row, icons of VeriCode, MaxCode, QR-Code, Data-Matrix, and PDF 417 are stored from left to right. In the two left-side cells of the second row, icons of Stacked Barcode and Barcode are stored. The center cell of the second row shows a number of available code symbol images. The two right-side cells of the second row show availability for optical character recognition and visual recognition.

The third row from the top of the two-dimensional array P has a root (basis) cell 40-1 at the center of the 5×5 two-dimensional array, which stores a number of icon symbols to be initially displayed full-size on the screen 8 when the power of device 1 is turned on. The root cell 40-1 includes basic symbols such as the current status of reception field strength of a wireless link, the remaining volume of the battery 6, the availability to recognize barcode and QR Code, the current calendar date and the current day of week. On the leftmost cell of the third row is stored a symbol image that indicates the availability to exchange signals with an RFID tag (IC card). The second left-side cell of the third row stores the symbol image of current field strength of wireless signal. In the two cells on the right side of the root cell 40-1 are stored symbol images respectively indicating the availability to wirelessly transmit a recognized code and the availability for the management of battery power.

In the fourth row from the top of the two-dimensional array P, the leftmost cell is one that is reserved for future use. The symbol image of the leftmost cell is a diagrammatic image of the 5×5 two-dimensional array P, with a solid block in the image signifying the position of its own cell in the matrix array. The cells on the right side of the fourth-row leftmost cell store symbols for display/key setting, device configuration/function setting, log-on/LAN status, and session procedure with a host terminal.

In the bottom row, the leftmost and rightmost cells are reserved cells. The cell adjacent to the leftmost cell is one in which the image of a monthly calendar is indicated for setting a user's schedule. The schedule comprises a monthly calendar and each day of the month may contain a list of data entry fields where the user can enter numerals (time-of-day) and characters as desired. In the third and fourth cells from left are the cells for setting the time of day and setting a time-out period.

As described below, the primary function of the processor 10 is to display the symbol image of one of the cells 40 that is currently selected by the cursor key 11 in response to a user's manual operation so that the center of the selected cell coincides with the center of the screen 8. In the present invention two display modes are available: the single-cell display mode and the multi-cell display mode.

Figure 6A:
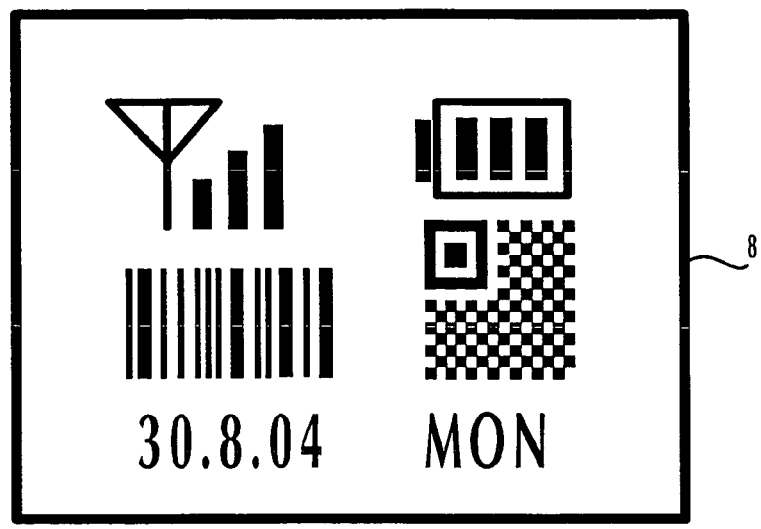

During the single-cell display mode, the root cell 40-1 is displayed on the screen 8 to fit in its full-size as shown in FIG. 6A.

Figure 6B:
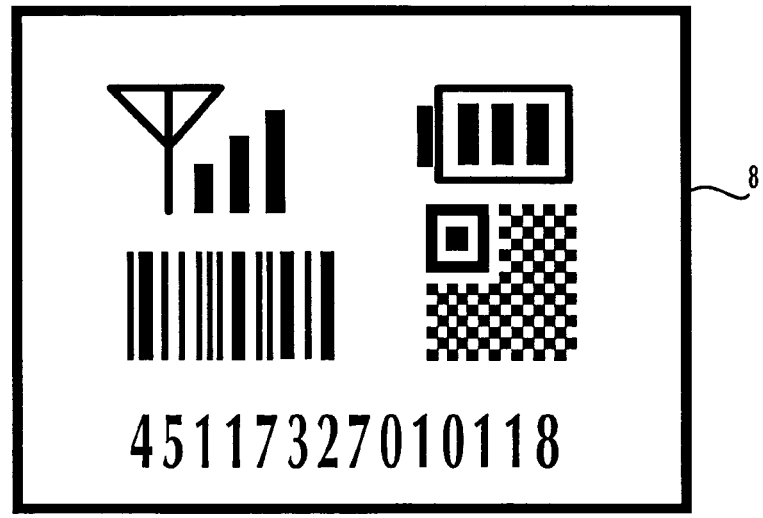
Figure 6C:
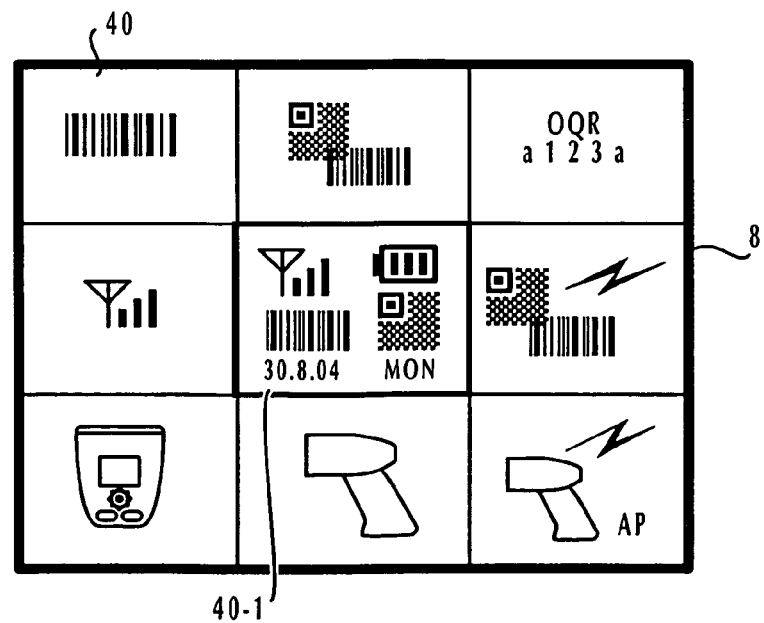
FIG. 6C is an illustration of a matrix array of cells displayed on the screen with the root cell being positioned at the center of the screen.
Figure 6D:
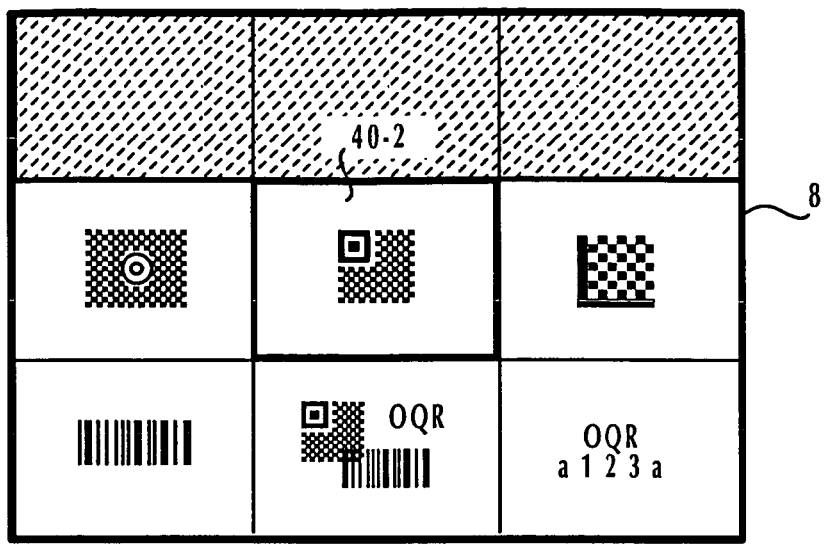
FIG. 6D is an illustration of a matrix array of cells displayed on the screen when a cell located on an edge of the array is selected.

On the other hand, during the multi-cell display mode, the user operates the cursor key 11 to select one of the two-dimensional array of cells. When a cell is selected, a 3×3 matrix array of cells including the selected cell and its surrounding eight adjacent cells are read from the memory 14 and put on display so that the 3×3 array fits in full size of the screen 8, as shown in FIGS. 6C and 6D, with each cell of the array being reduced in size by ⅓ of the single-cell display mode. In the latter case, the cell at the center of the array may be highlighted by a different color or enclosed by a thick-line rectangle.

Processor 10 performs a process by reading a 3×3 matrix array of cells from the icon memory 14 including the selected cell and the eight adjacent cells that surround it and displaying the matrix array on the screen 8 so that the selected cell is positioned at the center of the screen, replacing an adjacent cell which was previously displayed at the center of the screen. Processor 10 repeats this process in response to a cell being subsequently selected by the cursor key 11 until the enter key 11a is operated when a desired icon image is displayed at the center of the screen 8. Therefore, the point of selection is shifted one cell at a time from the cell displayed at the center of screen 8 to one of its neighbor cells in response to each operation of the cursor key 11. Therefore, the icon image displayed at the center of the screen 8 is replaced with the icon image of one of its eight neighbor cells when it is subsequently selected.

Figure 7:
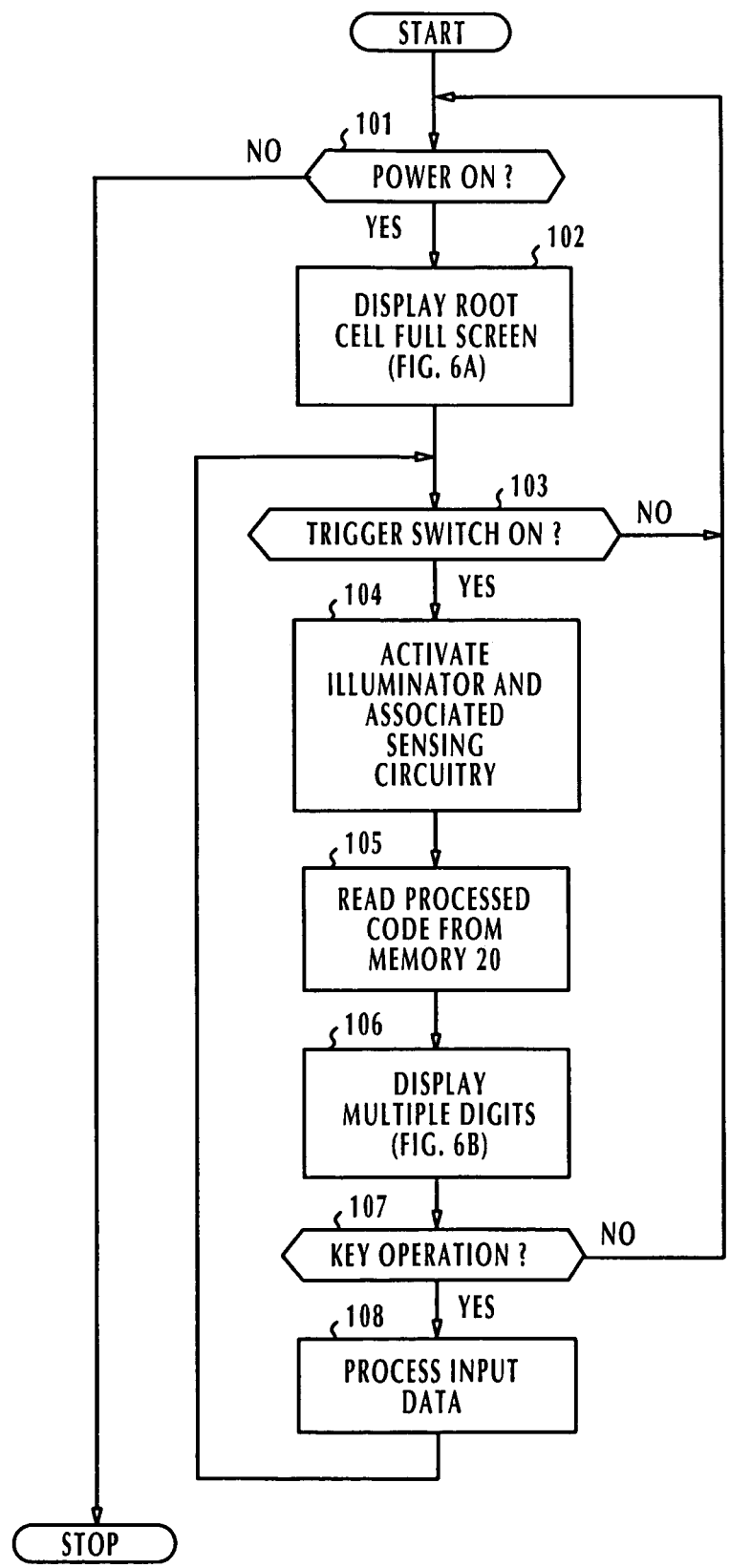
FIGS. 7 and 8 are flowcharts of the operation of the processor according to a first embodiment of the present invention.
Figure 8:
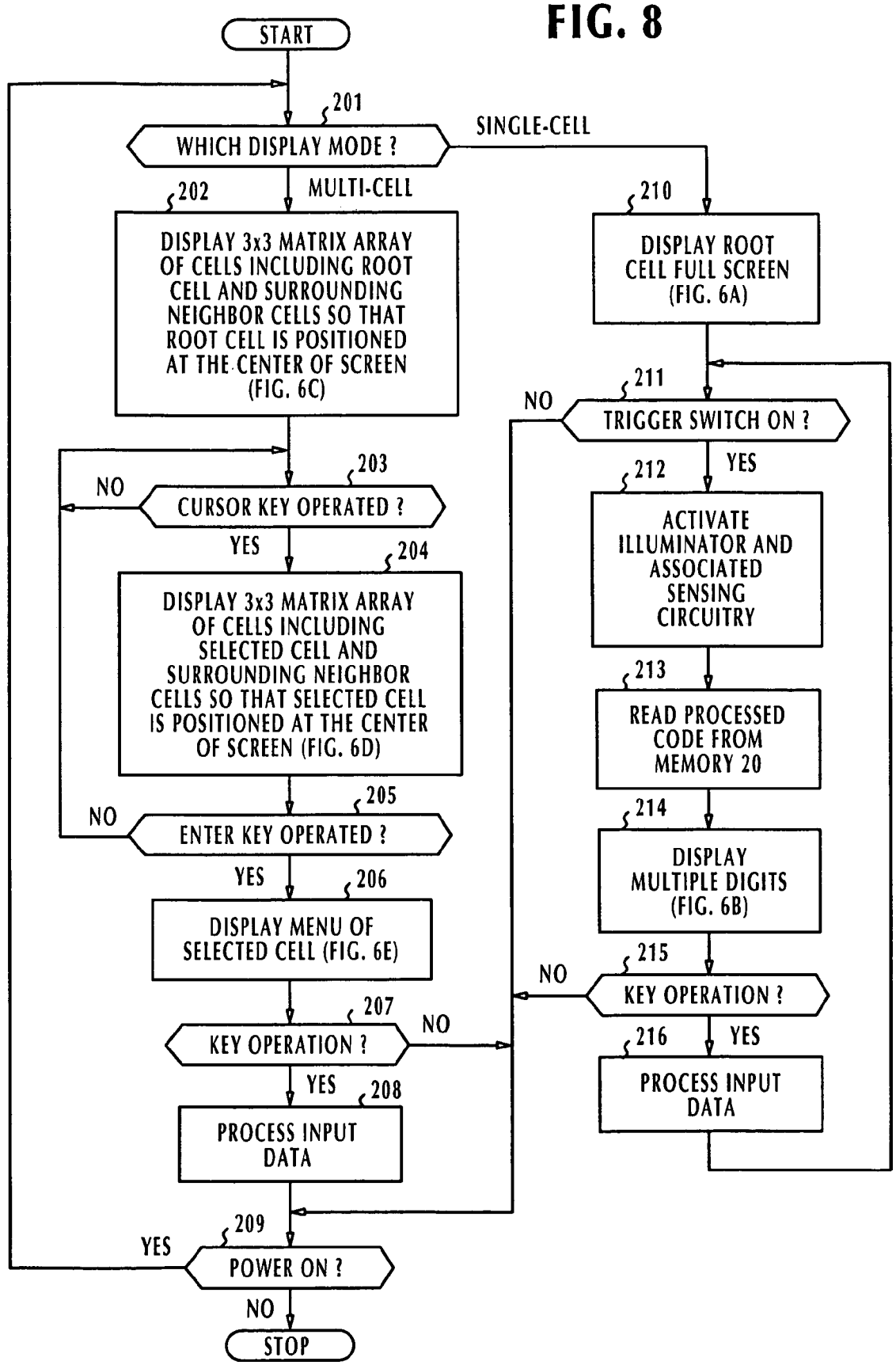

The operation of processor 10 to display the cells described above proceeds according to the flowcharts shown in FIGS. 7 and 8.

In FIG. 7, when the power switch of the device 1 is turned on by a user (step 101), flow proceeds to step 102 to read the root cell 40-1 from the memory 14 and displays the icon image of the root cell on the screen 8 so that it fits in full size of the screen, as shown in FIG. 6A. Since the image of the root cell 40-1 includes symbol images indicating the availability of recognizing Barcode and QR Code, the user may direct the personal device 1 toward a target object 30 and operate the trigger switch 2.

At decision step 103, the processor 10 checks to see if the trigger switch 2 is operated. If the trigger switch 2 is not operated within a predetermined timeout period, flow returns to step 102. If the trigger switch 2 is operated within the timeout period, the processor exits step 103 and proceeds to step 104 to activate the code reader including the illuminator 5, image sensor 3, amplifier 15 and A/D converter 16 to illuminate the target object with a sensing beam, and read and process the intended code. The image detected by the image sensor 3 is amplified, digitally coded and then processed by the feature detector 18 and transition detector 19 and stored in the data memory 20. Flow proceeds to step 105 to read the processed code from the data memory 20 and displays multiple digits, for example, on the screen 8, as shown in FIG. 6B (step 106). In response to a key operation entered by the user (step 107), the processor 10 reads data specified by the key operation and proceeds to step 108 to process the input data, and returns to step 103. If the trigger switch 2 is not operated within a given timeout period following the execution of step 106, flow returns to step 101 to display the symbol image of root cell 40-1 again.

If the user operates one of the return key 12 (single-cell display mode) and the forward key 13 (multi-cell display mode), the processor 10 starts executing the routine of FIG. 8. In the multi-cell display mode, the user is able to select one of the displayed cells which contains a menu indicating a list of choices or user-selectable items.

Processor 10 determines which of the display modes the user has selected (step 201). If the user selects the multi-cell display mode, the processor proceeds to step 202 to read a 3×3 matrix array of cells including the root cell 40-1 and its surrounding eight neighboring cells from the memory 14 and puts the array on display so that the array fits in full size (window) of the screen 8 and the root cell 40-1 is positioned at the center of the screen, as shown in FIG. 6C.

At step 203, the processor 10 checks to see if the cursor key 11 is operated. If so, flow proceeds to step 204 to read a 3×3 matrix array of cells including the selected cell and the surrounding adjacent cells, with the selected cell being positioned at the center of the 3×3 matrix array. Processor 10 displays the retrieved matrix array so that it fits in full size of the screen and the center of the selected cell coincides with the center of the screen. If the cursor key 11 has moved its selection point (cell lighted in reverse) to the cell 40-2, the displayed matrix array would appear as illustrated in FIG. 6D, with the symbol image of QR Code being located at the center of the screen 8. Since the selected 3×3 matrix array covers an area outside the top row of the 5×5 array of the memory 14, the cells on top row of the 3×3 array are left blank as illustrated in FIG. 6D.

At decision step 205, the processor 10 determines if the enter key 11a is depressed. If not, flow returns to step 203 to check to see if the cursor key 11 is operated again. If the previously selected cell is not positioned at the center of the screen, the user will operate the cursor key 11 again to move the pointer by one cell and select an adjacent cell. If this is the case, the processor 10 will successively make a negative decision at step 204 and an affirmative decision at step 203, and display a 3×3 matrix array containing the selected cell and its eight surrounding neighboring cells, with the selected cell being positioned at the center of the screen 8.

Figure 6E:
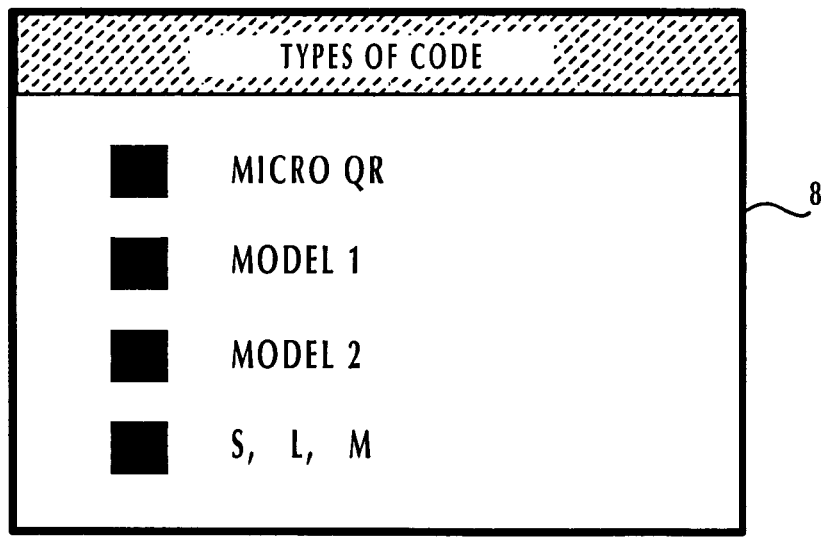
FIG. 6E is an illustration of the contents of a cell that is displayed at the center of the previous screen and then selected and displayed full screen to indicate a number of user-selectable items.
Figure 6F:
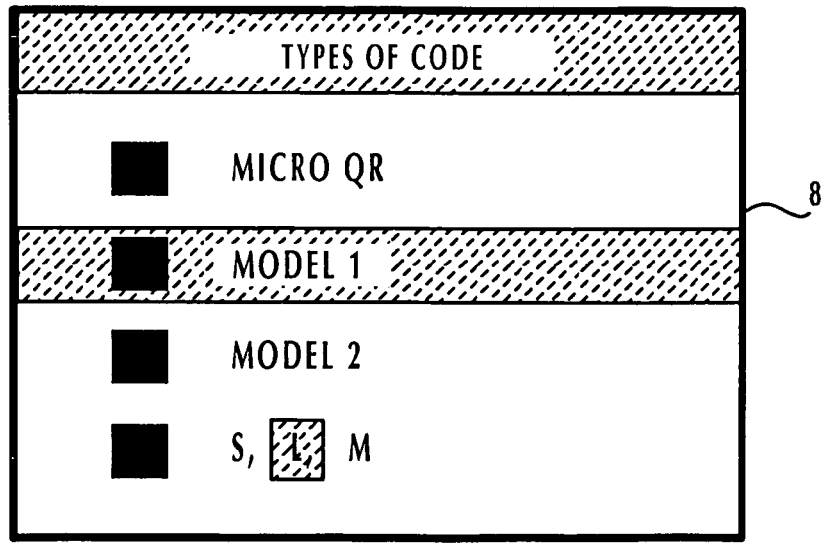
FIG. 6F is an illustration of the contents of a selected cell showing part of the contents marked when selected by the user.

If the cell currently displayed at the center of screen 8 contains the user desired symbol image, the user depresses the enter key 11*a*. In this case, the processor 10 makes an affirmative decision at subsequent step 204, and proceeds to step 206 to read the menu of the selected cell 40-2 from memory 14 and puts it on display so that it fits in full size of the screen, as shown in FIG. 6E. In the illustrated example, a menu window of the selected QR Code is displayed, indicating a number of user-selectable QR Code types (micro QR, Model 1, Model 2) and levels S, L, M of error correction (data recovery). The user selects one of the code types and one of the error correction levels by operating the cursor key 11 until the user depresses the enter key 11*a* when the pointer is moved to desired items. The selected items are highlighted as shown in FIG. 6F. If the user wants to cancel the selected item, the enter key 11*a* is depressed twice. In response to a key operation (step 207), an item of the displayed menu is entered and processed (step 208).

Processor 10 proceeds from step 208 to step 209 to check to see if the power switch of the device is still turned on. If the power is turned off, the routine is terminated. Otherwise, flow returns from step 209 to step 201.

If the user selects a single-cell display mode, the processor 10 proceeds from step 201 to step 210 to operate in the single-cell display mode in which the root cell 40-1 is displayed again so that it fits in full size of the screen 8 in the same manner as is displayed at step 102 of FIG. 7. Step 210 is subsequently followed by steps 211~216 which correspond in significance to steps 103~108, respectively.

Since the selected icon image is positioned at the center of a displayed 3×3 matrix array, the user can easily identify its contents and its position in the array P from its neighbor icon images. By repeatedly displaying different matrix arrays of icon images, the user may eventually acquire a whole picture of available icons. This visual impression will assist the user in making a quick search for a desired symbol with a significantly smaller number of key operations than is necessary with the prior art tree-structured search. This is particularly true in applications where the number of frequently used icon images is limited. In addition, the tilting mechanism of the cursor key 11 for selecting a cell and its integral depression mechanism for entering a user's decision command greatly simplify the structure of the key arrangement and enhance the operability of the device. Moreover, the user is given enhanced convenience to use the device since the root cell 40-1 is initially displayed full-size on the screen 8 to show multiple basic features when the power of the device is turned on.

Figure 9:
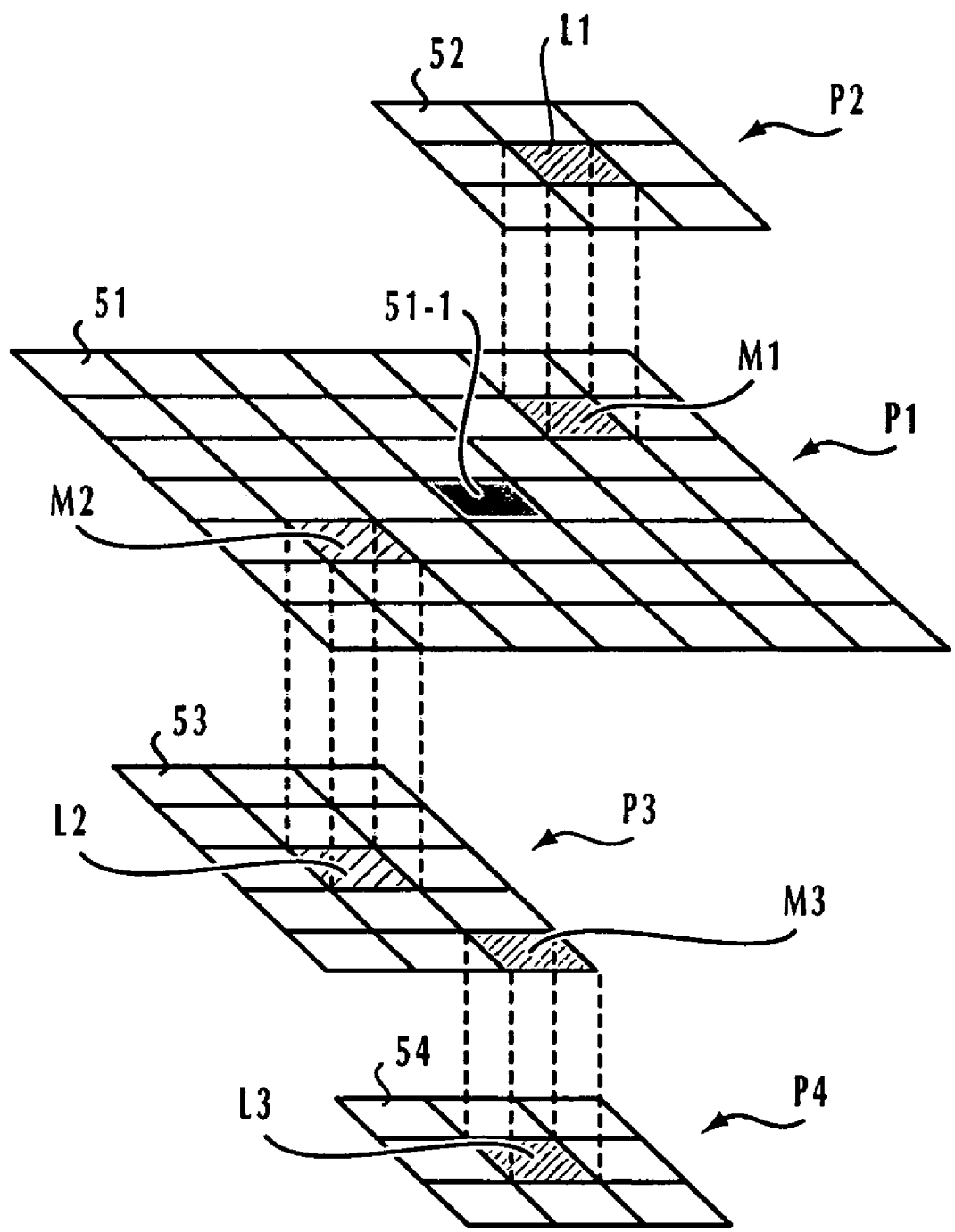
FIG. 9 is a diagrammatic view of a layered structure of the two-dimensional array of cells according to a second embodiment of the present invention.

A modified embodiment of the memory structure is shown in FIG. 9. This embodiment allows the handheld personal device to increase its amount of cells that can be displayed while saving the memory space.

In this modification, a first group of cells 51 is arranged on a first matrix array P1 of rows and columns (as a root array). A group of single-function cells 52 is arranged on a second matrix array P2 (leaf array of P1). Likewise, a third group of cells 53 of different types is arranged on a third matrix array P3 (as a leaf array of P1), and a fourth group of single-function cells 54 is arranged on a fourth matrix array P4 (leaf array of P3).

First matrix array P1 includes a first multi-function cell M1 having a number of functions which are represented by the single-function cells 52 of the leaf array P2 and a second multi-function cell M2 having a number of functions which are represented by the cells 53 of the leaf array P3. Leaf array P3 has a multi-function cell M3 having a number of functions respectively represented by the single-function cells 54 of leaf array P4.

Thus, the root array P1 is the parent of leaf arrays P2 and P3 and the leaf array P3 is the parent of leaf array P4.

On the root array P1, the multi-function cell M1 is linked to a single-function cell L1 (linking cell) which is positioned at the center of leaf array P2 and the multi-function cell M2 is linked to a single-function cell L2 which is positioned at the center of the leaf array P3. On the leaf array P3, the multi-function M3 is linked to a single-function cell L3 positioned at the center of the leaf array P4.

Root matrix array P1 is the basic array which includes a root cell 51-1, identical to the root cell 40-1 described above, at the center of the array.

Figure 10:
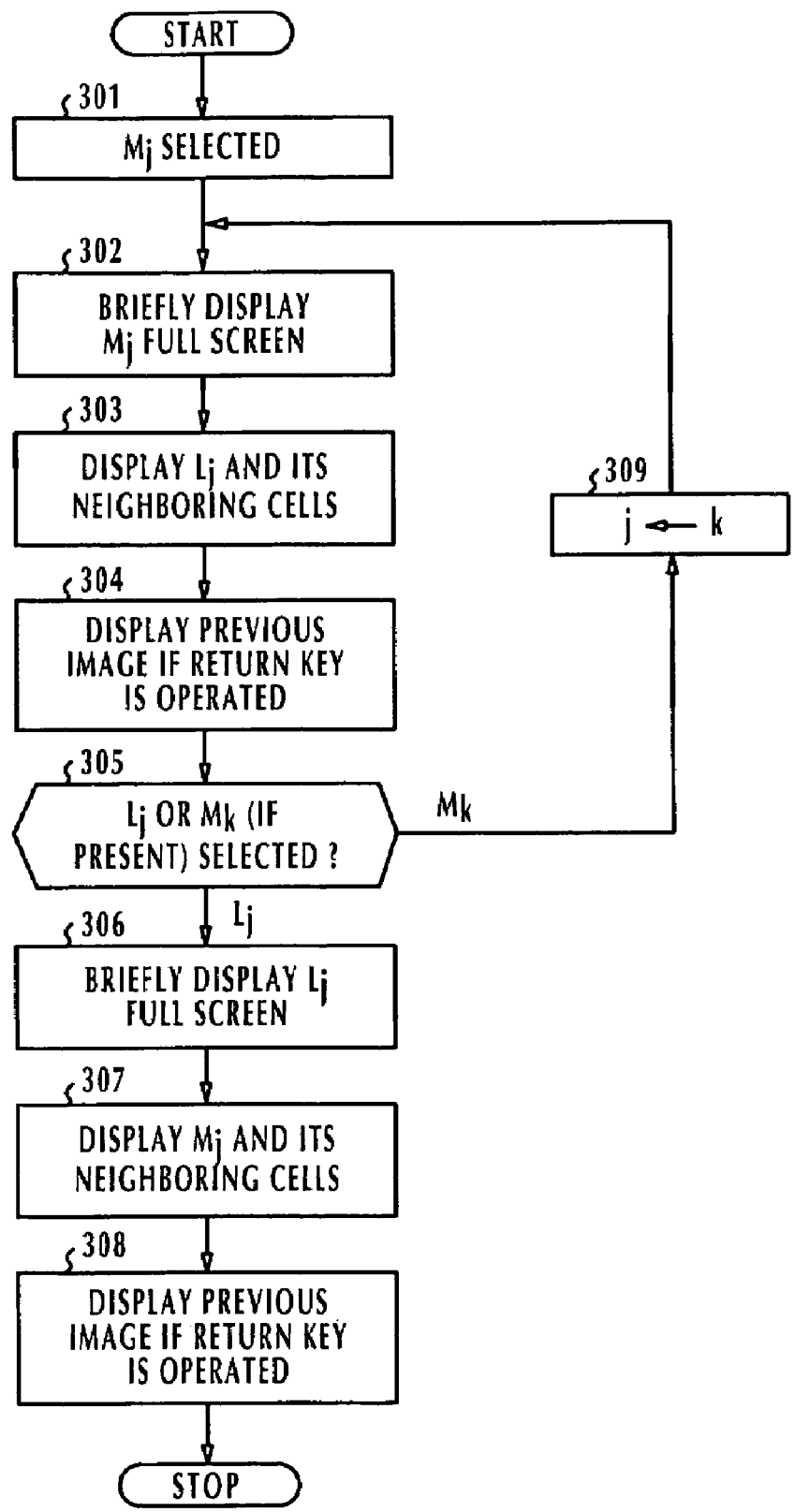
FIGS. 10 and 11 are flowcharts of the operation of the processor according to the second embodiment.

With the icon memory 14 being structured in multiple layers as shown in FIG. 9, the operation of the processor 10 proceeds according to a generalized routine shown in FIG. 10, in which variables $M_j$ and $L_j$ represent a multi-function cell and a single function cell linked to the multi-function cell.

When a cell $M_j$ is selected by the user operating the enter key 11*a* at step 301, flow proceeds to step 302 to briefly display the selected cell full screen. At step 303, the processor 10 displays the linked cell $L_j$ and its neighboring cells with $L_j$ being positioned at the center of the screen 8. If the return key 12 is operated, the previous image is displayed, instead of the current image (step 304).

Processor 10 determines, at step 305, whether a cell $L_j$ or $M_k$ (if present) is subsequently selected. If $L_j$ is selected, flow proceeds to step 306 to briefly display the selected cell full screen. At step 307, the processor 10 displays the linked cell $M_j$ and its neighboring cells with $M_j$ being positioned at the center of the screen 8. If the return key 12 is operated, the previous image is displayed instead of the current image (step 308).

If $M_k$ is selected, flow proceeds from step 305 to step 309 to replace the subscript "j" of variable $M_j$ with "k" and returns to step 302 to repeat the process.

Figure 11:
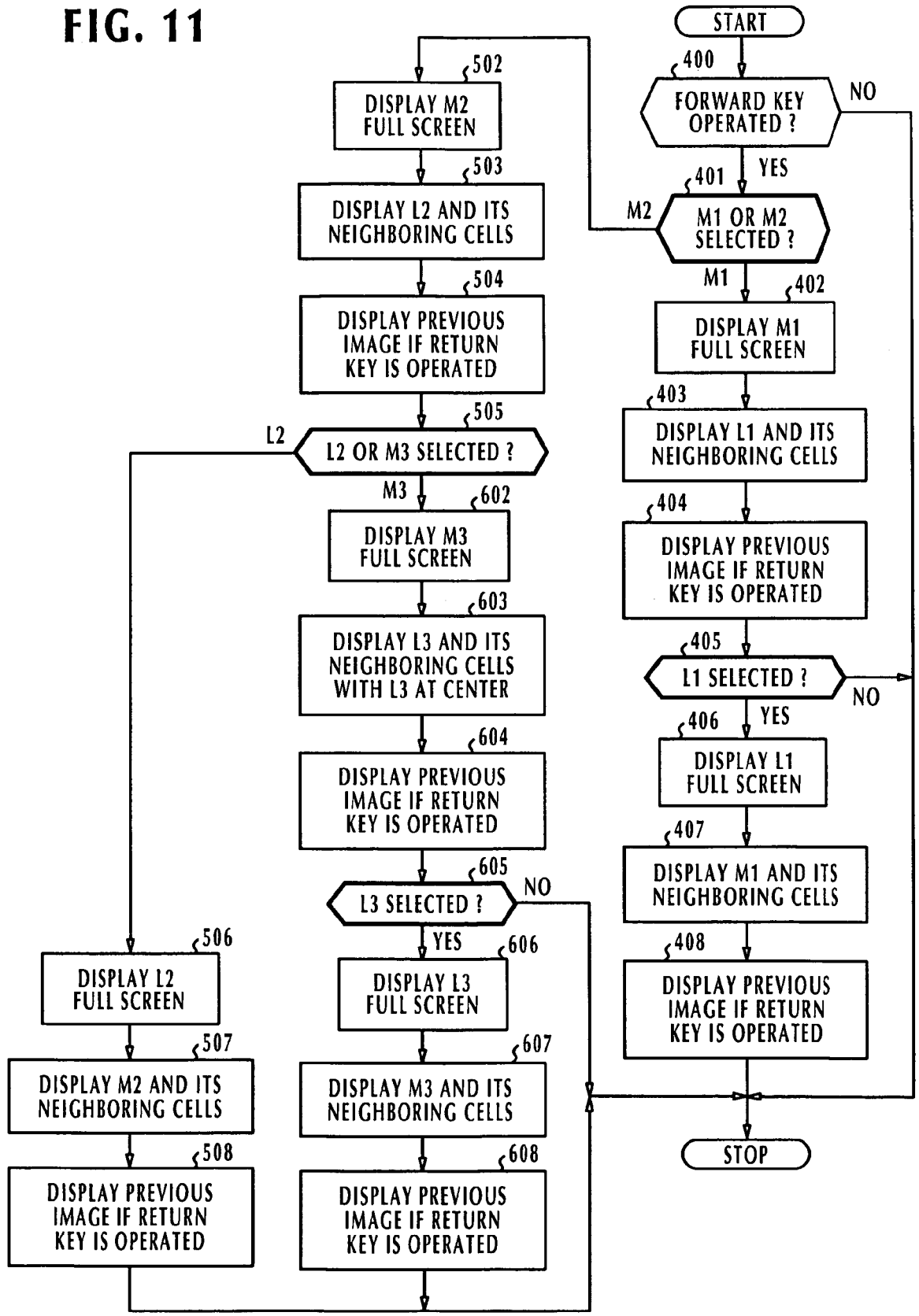

More specifically, the processor 10 operates according to the flowchart of FIG. 11 to process a series of events which will take place when the user selects a cell in sequence on the multi-layered structure of memory 14 shown in FIG. 9. The routine begins with decision step 400 which checks to see if the device is in the multi-cell display mode. If the forward key 13 is operated, the device is in the multi-cell display mode, and flow proceeds to step 401 to determine which of the cells the user has selected.

If the selected cell is other than M1 and M2, the processor exits step 401 and operates in a manner similar to steps 202~209 of FIG. 8.

If M1 is selected, flow proceeds from step 401 to step 402 to display the selected cell in full size of the screen 8 for a short interval of time, and then display a 3×3 matrix array of the cell L1 at the center of the array and its neighboring cells of array P2, instead of the previous screen image of step 402, so that the cell L1 is positioned at the center of the screen 8 (step 403).

Flow proceeds to step 404 to display the previous image if the return key 12 is operated, using the link between L1 on the current image and M1 on the previous image.

At step 405, if L1 is selected from the cells of the currently displayed matrix array P2, the selected cell is displayed full screen for a short duration (step 406) and then the cell M1 and its neighboring cells on the array P1 are displayed so that M1 is positioned at the center of the screen (step 407).

Flow proceeds to step 408 to display the previous image if the return key 12 is operated, using the link between M1 on the current image and L1 on the previous image.

If the decision at step 401 indicates that the user has selected the cell M2, the processor 10 proceeds to step 502 to display the cell M2 in full size of the screen 8 for a short interval of time and then displays a 3×3 matrix including the cell L2 at the center of the matrix and its neighboring cells of leaf array P3, at step 503, so that cell L2 is positioned at the center of the screen 8.

Flow proceeds to step 504 to display the previous image if the return key 12 is operated, using the link between L2 on the current image and M2 on the previous image.

At step 505, if M3 is selected from the currently displayed 3×3 matrix of the leaf array P3, the selected cell is displayed full screen for a short duration (step 602) and then the 3×3 leaf array P4 is displayed with the linking cell L3 being positioned at the center of the screen (step 603).

Flow proceeds to step 604 to display the previous image if the return key 12 is operated, using the link between the cell L3 on the current image and the cell M3 on the previous image.

At step 605, if the linking cell L3 is selected from the currently displayed matrix array P4, the selected cell is displayed full screen for a short duration (step 606) and then a 3×3 matrix array including the cell M3 and its neighbor cells on the leaf array P3 is displayed so that the cell M3 is positioned at the center of the screen (step 607).

Flow proceeds to step 608 to display the previous image if the return key 12 is operated, using the link between the cell M3 on the current image and the linking cell L3 on the previous image.

If the cell L2 is selected from the displayed 3×3 matrix of the leaf array P3 at step 505, the selected cell is displayed full screen for a short interval of time (step 506) and then a 3×3 matrix array including the cell M2 and its neighbor cells on the root array P1 is displayed so that the cell M2 is positioned at the center of the screen (step 507).

Flow proceeds to step 508 to display the previous image if the return key 12 is operated, using the link between the cell M2 on the current image and the linking cell L2 on the previous image.

Figure 12A:
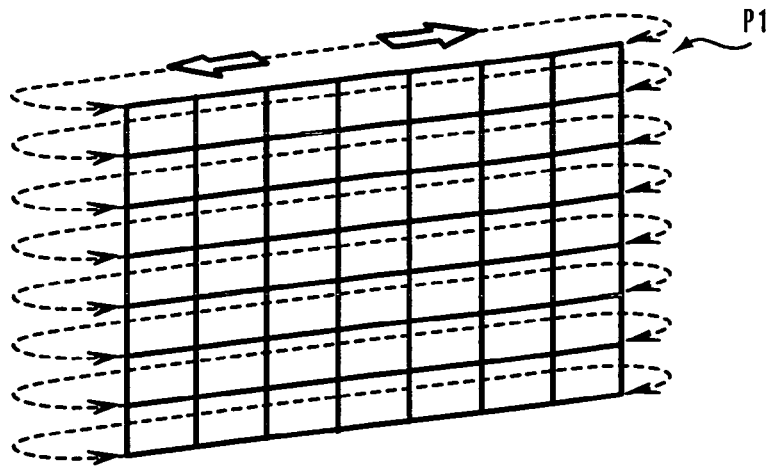
FIGS. 12A and 12B are illustrations of the two-dimensional array of cells endlessly connected in horizontal and vertical directions.
Figure 12B:
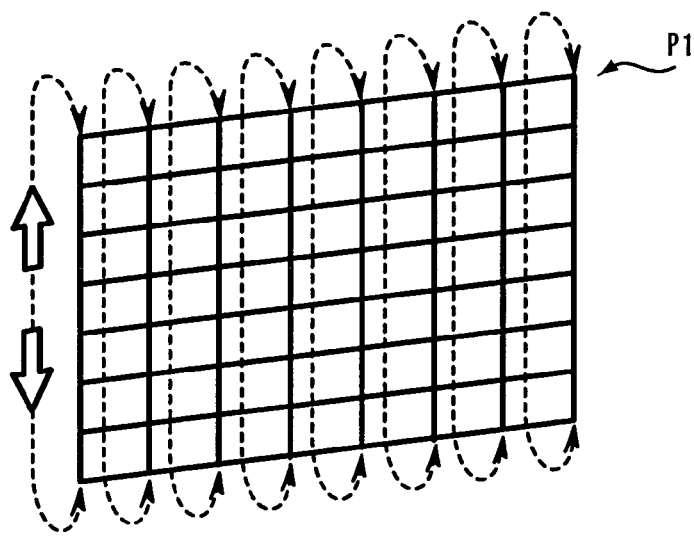

While mention has been made of embodiments in which the two-dimensional array of cells is defined by limits on their sides so that when a cell near an edge of the array is selected and placed at the center of a 3×3 matrix array surrounded by neighbor cells, blank cells appear in the displayed array. This is avoided by an endless loop which is formed by connecting the columns on the opposite sides of the two-dimensional array as shown in FIG. 12A or connecting the top and bottom rows of the array as shown in FIG. 12B. The endless loops allow the user to scroll in opposite directions, either horizontally or vertically, and also eliminate the need to scroll back all the way through the rows or columns when the user reaches an edge of the array.

Figure 13:
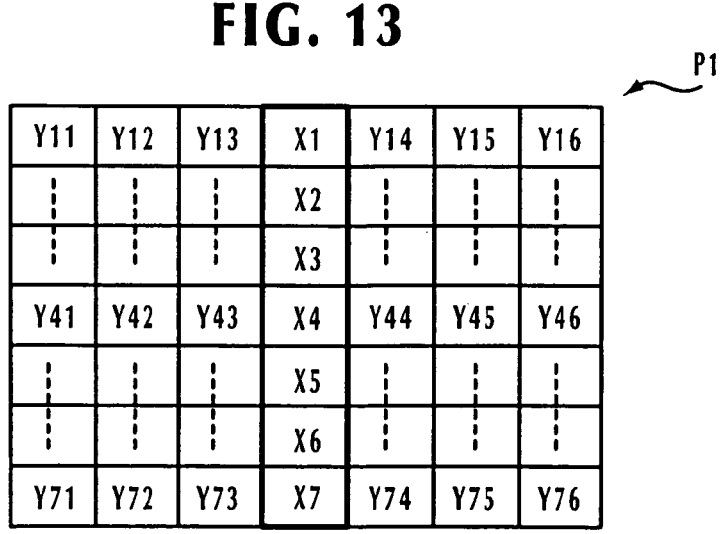
FIG. 13 is an illustration of the two-dimensional array of cells configured to store functions of primary importance in a center column (center row) and store functions of secondary importance in a plurality of rows (columns)
Figure 14:
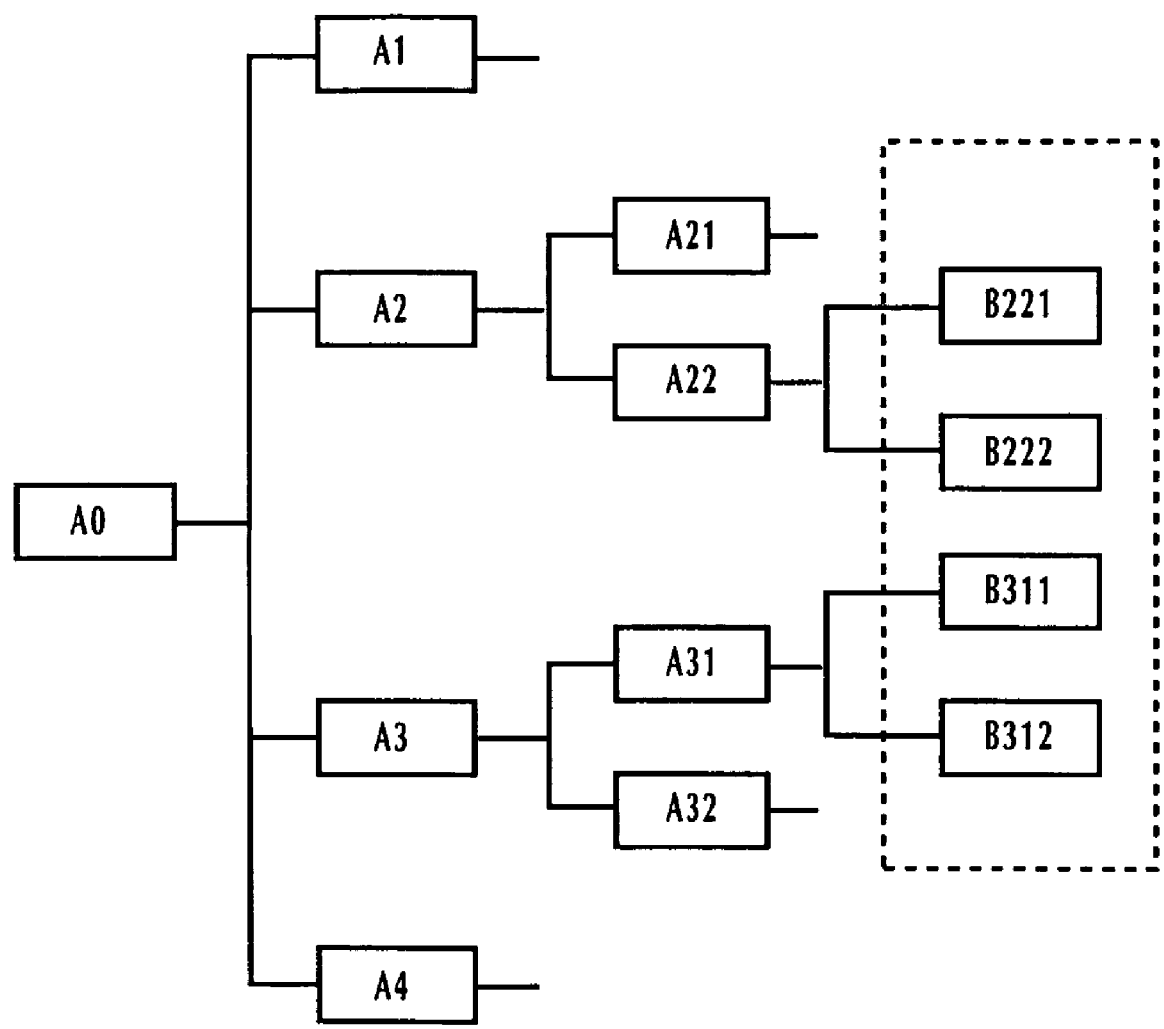
FIG. 14 is a diagram of the hierarchical tree structure of the prior art for arranging display items.

FIG. 13 shows another example of the memory structure that is configured to enable its contents to be easily identified by the user. In this modified structure, the center column of the two-dimensional array P1 is a main menu that contains a list of functions of primary importance and these information items are respectively stored in the cells X1 through X7, with the cell X4 at the center of the column being the root cell. Each of the cells Xi (where i=1, 2, 3, . . . , 7) is a submenu having a list of functions of secondary importance, and these information items are respectively stored in the cells Yij (where j=1, 2, . . . , 6) on the opposite sides of the corresponding cell Xi.

Instead of the center column, the main menu may be provided in the center row of the two-dimensional array P1. In this case, each cell of the center row of cells stores one of a list of functions of primary importance. Each cell of columns positioned on each side of the center row corresponds to one of the cells of the center row. Each of the columns on each side of the center row stores a list of functions of secondary importance associated with the function of the corresponding cell of the center row.

What is claimed is:

1. An information reading apparatus comprising:
   a display unit having a screen;
   a memory having a plurality of cells arranged in a two-dimensional array of rows and columns, each cell storing at least one symbol image to be displayed on said screen;
   a key arrangement that selects one of the cells displayed on said screen as a candidate image by moving a point of selection by a distance corresponding to one cell of said memory in response to a user's operation and enters a user's decision command when a desired candidate image is displayed at the center of said screen; and
   a control unit that performs the functions of reading a matrix array of cells from said memory including said selected cell and adjacent cells surrounding the selected cell and displaying the matrix array on said screen so that the selected cell is positioned at the center of said screen and replaces an adjacent cell which was previously displayed at said center, and repeatedly performs said functions of reading and displaying in response to each of said cells being subsequently selected by a user's operation until said user's decision command is entered.

2. The information reading apparatus of claim 1, further comprising a mode selection key that selects a single-cell display mode or a multi-cell display mode, and wherein said control unit controls said display unit according to mode selected by said mode selection key.

3. The information reading apparatus of claim 2, wherein said control unit displays the selected cell on said screen during said single-cell display mode so that the displayed cell fits in full size of said screen and displays said matrix array including the selected cell on said screen during said multi-cell display mode so that said matrix array fits in full size of said screen and the selected cell is positioned at the center of the screen.

4. The information reading apparatus of claim 3, wherein said matrix array comprises a 3×3 matrix array of cells.

5. The information reading apparatus of claim 3, wherein said symbol image is an icon.

6. The information reading apparatus of claim 3, wherein said control unit displays the selected symbol image on said screen when said user's decision command is entered during said multi-cell display mode so that the displayed symbol image fits in full size of said screen.

7. The information reading apparatus of claim 1, wherein said key arrangement includes a cursor key that can be manually tilted in one of four radial directions equally spaced apart at intervals of 90-degree angle to move the selected cell in one of said directions.

8. The information reading apparatus of claim 1, wherein said key arrangement includes a cursor key that can be manually tilted in one of eight radial directions equally spaced apart at intervals of 45-degree angle to move said selected cell in one of said directions.

9. The information reading apparatus of claim 7, wherein said cursor key is configured to enter said user's decision command when the cursor key is manually depressed.

10. The information reading apparatus of claim 1, wherein one of said plurality of cells is a root cell and said control unit displays the root cell when said information reading apparatus is initially activated.

11. The information reading apparatus of claim 2, wherein the two-dimensional array is a root array and at least one of the cells of the root array is a multi-function cell which contains a list of symbol images indicating user-selectable functions, wherein said memory further includes a plurality of cells, which are arranged in a matrix array of rows and columns and respectively contain said symbol images of said list, said matrix array being a leaf array of said root array and one of the cells in said leaf array being a linking cell which is coupled through a link to said multi-function cell of the root array, and wherein said control unit performs switching between said multi-function cell and said leaf array through said link in response to a user's key operation.

12. The information reading apparatus of claim 11, wherein said control unit displays said leaf array on said screen so that said linking cell is positioned at the center of the screen when said multi-function cell is selected by said key arrangement during the multi-cell display mode.

13. The information reading apparatus of claim 11, wherein said control unit displays said multi-function cell in full size of said screen for a predetermined interval of time before said matrix array of cells is displayed.

14. The information reading apparatus of claim 11, wherein said control unit displays the multi-function cell of said root array so that said multi-function cell is positioned at the center of the screen when said linking cell of the leaf array is selected by said key arrangement during the multi-cell display mode.

15. The information reading apparatus of claim 14, wherein said control unit displays said linking cell in full size of said screen for a predetermined interval of time before said matrix array of cells is displayed.

16. The information reading apparatus of claim 11, wherein, when one of the cells of said leaf array is displayed on said screen, said control unit displays said multi-function cell of the root array in full size of said screen, instead of the currently displayed cell, in response to a predetermined user's key operation.

17. The information reading apparatus of claim 1, wherein said two-dimensional array of cells include at least one cell which is reserved for future use, said reserved cell containing a symbol image represented by a rectangular image of said two-dimensional array with a mark identifying the location of the reserved cell in said rectangular image.

18. The information reading apparatus of claim 1, wherein top and bottom rows of said two-dimensional array of cells are directly connected together so that said control unit is able to endlessly read the memory in vertical directions and wherein leftmost and rightmost columns of said two-dimensional array of cells are directly connected together so that said control unit is able to endlessly read the memory in horizontal directions.

19. The information reading apparatus of claim 1, wherein said two-dimensional array of cells include:

a center column of cells each of which stores one of a plurality of functions of primary importance; and a plurality of rows each of which is positioned on each side of said center column and corresponds to one of the cells of the center column, each of said plurality of rows on each side of said center column storing a list of functions of secondary importance associated with the function of the corresponding cell of said center column.

20. The information reading apparatus of claim 1, wherein said two-dimensional array of cells include:

a center row of cells each of which stores one of a plurality of functions of primary importance; and a plurality of columns each of which is positioned on each side of said center row and corresponds to one of the cells of the center row, each of said plurality of columns on each side of said center row storing a list of functions of secondary importance associated with the function of the corresponding cell of said center row.

21. The information reading apparatus of claim 1, further comprising a sensing mechanism that wirelessly detects pictorial or textual information from a target object.

22. The information reading apparatus of claim 21, wherein said control unit activates said sensing mechanism when said root cell is displayed and a user's command is entered.

23. A method of displaying stored symbol images on a screen of an information reading apparatus, comprising the steps of:

a) storing a plurality of cells in a two-dimensional array of rows and columns of a memory, each of said cells containing a symbol image;

b) selecting one of the cells displayed on said screen as a candidate image by moving a point of selection by a distance corresponding to one cell of said array in response to a user's operation;

c) reading a matrix array of cells from said memory including said selected cell and neighboring cells surrounding the selected cell;

d) displaying the matrix array on said screen so that the selected cell is positioned at the center of said screen; and e) entering a user's decision command when a desired candidate image is displayed at the center of said screen.

24. The method of claim 23, wherein said two-dimensional array of cell includes a root cell at the center of the array, further comprising the step of displaying said root cell in full size of said screen when power of said device is initially turned on.

25. The method of claim 24, further comprising the steps of:

wirelessly sensing pictorial or textual information from a target object when said root cell is displayed;

decoding the sensed information; and displaying the decoded information on said screen.

26. The method of claim 24, further comprising the steps of:

f) displaying a matrix array of cells including said root cell and neighboring cells surrounding said root cell so that said root cell is positioned at the center of the screen;

g) selecting one of the cells of said displayed matrix array in response to a user's selection command;

h) displaying a matrix array of cells including said selected cell and neighboring cells surrounding the selected cell so that the selected cell is positioned at the center of the screen;

i) repeating the steps (g) and (h) until a user's decision command is entered; and j) displaying contents of the selected cell.

27. The method of claim 24, further comprising the step of displaying the root cell in full size of said screen in response to a predetermined user's command.

28. The method of claim 23, further comprising the steps of:

A) organizing a plurality of said cells into a first matrix array of rows and columns serving as a root array and a second matrix array of rows and columns serving as a leaf array, said leaf array having a specified cell linked to a specified cell of said root array;

B) selecting the specified cell of the root array in response to a user's selection command;

C) displaying a matrix array of cells on said screen, including the specified cell of said leaf array and neighboring cells surrounding the specified cell so that the specified cell of the leaf array is positioned at the center of the screen;

D) selecting the specified cell of the leaf array in response to a user's selection command; and E) displaying a matrix array of cells on said screen, including the specified cell of said root array and neighboring cells surrounding the specified cell so that the specified cell of the root array is positioned at the center of the screen.

29. The method of claim 28, wherein step (D) further comprises the step of selecting a second specified cell of said root array of cells which is linked to a specified cell of a third two-dimensional array of rows and columns serving as a second leaf array, the method further comprising the steps of:

F) displaying a matrix array of cells on said screen, including the specified cell of said second leaf array and neighboring cells surrounding the specified cell so that the specified cell of the second leaf array is positioned at the center of the screen;

G) selecting the specified cell of the second leaf array in response to a user's selection command; and H) displaying a matrix array of cells on said screen, including the second specified cell of said root array and neighboring cells surrounding the second specified cell so that the second specified cell of the root array is positioned at the center of the screen.

30. The method of claim 28, wherein step (C) further comprises the step of briefly displaying the specified cell of said root array in full size of said screen before displaying said matrix array.

31. The method of claim 28, wherein step (E) further comprises the step of briefly displaying the specified cell of said leaf array in full size of said screen before displaying said matrix array.

* * * * *